United States Patent [19]

Umehara et al.

[11] 4,382,668
[45] May 10, 1983

[54] COMPACT CAMERAS USING A DISK TYPE FILM CARTRIDGE

[75] Inventors: Nobuo Umehara, Suita; Maki Yamashita, Sakai; Akira Yoshizaki, Osaka, all of Japan

[73] Assignee: Minolta Camera Kabushiki Kaisha, Osaka, Japan

[21] Appl. No.: 355,786

[22] Filed: Mar. 8, 1982

Related U.S. Application Data

[63] Continuation of Ser. No. 264,891, May 18, 1981, abandoned.

[30] Foreign Application Priority Data

May 21, 1980 [JP] Japan .................................. 55-66548

[51] Int. Cl.³ .............................................. G03B 1/00
[52] U.S. Cl. ..................................... 354/121; 354/173; 354/204
[58] Field of Search ........ 354/121, 170, 171, 173–175, 354/204, 187; 352/102, 103

[56] References Cited

U.S. PATENT DOCUMENTS 3,630,130 12/1971 Erlichman .
4,032,940 6/1977 Chan .................................. 354/187
4,041,512 8/1977 Iwata et al. ........................ 354/234
4,202,614 5/1980 Harvey .............................. 354/121
4,222,649 9/1980 Niwa et al. ........................ 354/173
4,265,525 5/1981 Stella et al. ...................... 354/121 X

*Primary Examiner*—John Gonzales
*Attorney, Agent, or Firm*—Wolder, Gross & Yavner

[57] ABSTRACT

A flat compact camera employing a disk type film cartridge includes a body member having an open topped cavity and directly mounting an objective lens and a chamber member replaceably housing a film cartridge and hinged along its rear to the camera body for swinging between a photographically inoperative position retracted into the cavity and an operative condition extending from the cavity. A mirror located in the cavity is swingable between retracted and advanced positions respectively offset from and intercepting the objective lens optical axis in response to the chamber member retracted and advanced positions. The shutter and film advancing mechanisms are housed in the chamber member and the viewfinder in the body member and the chamber member is spring biased toward its extended position and the mirror toward its advanced position, the chamber being releasably locked in retracted position.

10 Claims, 11 Drawing Figures

COMPACT CAMERAS USING A DISK TYPE FILM CARTRIDGE

This is a continuation of application Ser. No. 264,891 filed May 18, 1981 abandoned.

BACKGROUND OF THE INVENTION

The present invention relates to improvements in cameras and it relates particularly to an improved compact camera using a disk type film cartridge assembly.

A disk type film cartridge assembly is characterized by its extremely thin structure as compared with other types of film cartridge assemblies, for example, the 110 size film cartridge assemblies marketed by Eastman Kodak. Cameras using a disk type film cartridge assembly, in order to take advantage of the structure of such cartridge should be thin in body shape. However, the prior art cameras of this type are provided with a space (i.e. the so-called camera) required to afford a path for the light or to house a reflecting mirror in front of the exposure plane, making it impossible to significantly reduce the thickness of the camera body and thus posing a problem. A typical example of this type camera is described in U.S. Pat. No. 4,202,614 issued May 13, 1980. This camera is so constructed that object light focused on the film plane through an objective lens is reflected by a mirror to direct to to the exposure plane, thereby requiring a large space in front of the exposure plane for housing the reflecting mirror. With this prior art camera, however, the space for housing the reflecting mirror is, in addition to the space needed for housing a film cartridge, resulting in an increased camera body thickness, whereby it is impossible to appreciably reduce the thickness of the camera body.

SUMMARY OF THE INVENTION

Accordingly, a primary object of the present invention is to provide an improved camera of the type using a disk type film cartridge assembly.

Another object of the present invention is to provide an improved disc type film cartridge camera which is of a construction which permits an extremely thin body portion.

Still another object of the present invention is to provide the improved camera which requires no special optical components and is capable of achieving a very thin body portion.

The above and further objects of the present invention will become apparent from a reading of the following description taken in conjunction with the accompanying drawings, which illustrate preferred embodiments thereof.

A camera in accordance with the present invention employs a disk type film cartridge in which the film disk is rotated successive increments to advance successive sections of the film into registry with a frame delineating window in the cartridge casing the camera comprising a main body member having a cavity therein, an objective lens mounted on the main body member and a chamber member for replaceably housing a film cartridge mounted to the main body member and movable between a photographically inoperative position retracted into the cavity and a photographically operative position extending from the cavity.

In a preferred form of the improved camera the chamber member is hinged along its rear to the body member and in extended position the window delineated film frame is in the objective lens focal plane. A mirror is located in the body member cavity and is swingable in response to the position of the chamber member between a retracted position offset from the objective lens optical axis and an operative position intercepting the objective lens optical axis to focus the object light onto the film frame which is positioned in the objective lens focal plane when the chamber member is extended. A lid provides access to the cartridge chamber and a shutter mechanism and a film advancing mechanism are housed in the chamber member and a view finder is housed in the body member.

The improved camera is compact and of minimum thickness, easy and convenient to operate and carry, and is of great versatility and adaptability.

BRIEF DESCRIPTION OF THE DRAWINGS

FIG. 2 (B) is a vertical longitudinal cross-sectional view thereof taken along the optical axis;

FIG. 3 (B) is a cross-sectional view similar to FIG. 3 (A) of the exposed camera;

DESCRIPTION OF THE PREFERRED EMBODIMENTS

Figure 1:
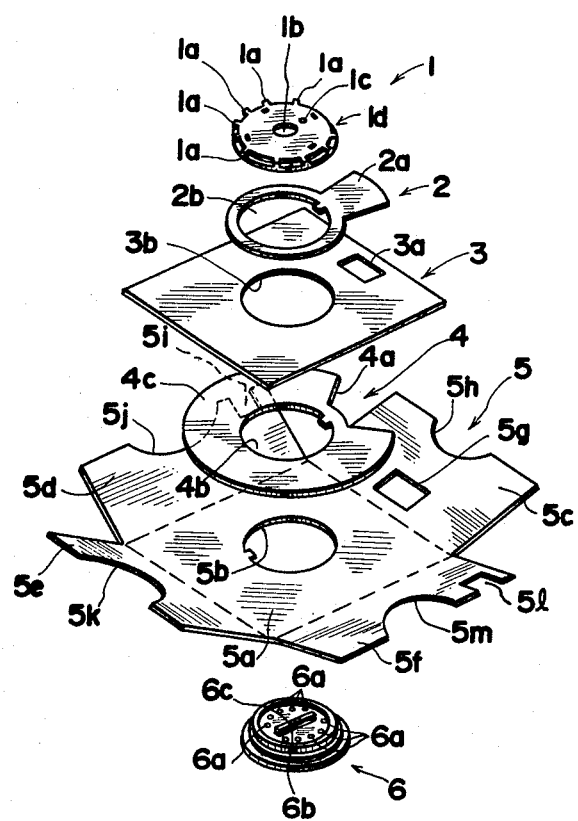
FIG. 1 is an exploded perspective view of a disk type film cartridge assembly for use in the camera of the present invention.

Referring now to the drawings, particularly FIG. 1 thereof which illustrates the prior art disk type film cartridge assembly described in U.S. Pat. No. 4,202,614, reference numeral 1 generally designates a hub member provided with a plurality of radial index ears 1a in projecting radially outwardly at equally spaced angular intervals, a central spindle hole and an eccentric coupling hole 1c. Affixed to hub member 1 is rotatable cover slide 2 including an outer peripheral cover slide segment 2a and a hub coupling opening 2b formed in the center thereof, so that the hub and the cover slide are integrally rotatable. The reverse face of rotatable cover slide 2 is superimposed on a baffle sheet 3 having a central opening 3b, into which a stepped ring structure 1d of hub 1 is fitted, and rectangular opening of window 3a for a frame exposure proximate to the central opening. A disk type film 4 is positioned on the underside of baffle sheet 3. Disk type film 4 is formed with a central opening 4b and is fixed to hub member 1. Formed in the periphery of film disk 4 is segmental slot 4a located at a position corresponding to peripheral cover slide segment 2a of rotatable cover slide 2.

The film cartridge assembly includes a housing casing member is improved with square center section 5a slightly larger than baffle sheet 3. A central opening 5b is formed in square center section 5a and lateral flaps 5c, 5d, 5e and 5f project from the respective sides of section 5a. Formed in lateral flap 5c are a rectangular exposure opening of window 5g matching rectangular exposure opening 3a of baffle sheet 3, and a semi-circular opening 5h coinciding with a corresponding section of central opening 5b when flap 5c is folded over square center section 5a. An edge cutout 5a and a semi-circular opening 5j are formed in the outer edge of lateral flap 5d. A semi-circular opening 5k is formed in the outer edge of lateral flap 5e, and a semi-circular opening 5m and an edge cutout 5l are formed in the outer edge of lateral flap 5f.

A disk 6 engages central opening 5b of casing member 5 folded as described above so that it becomes integral with casing member 5 to serve as a hub support member which rotatably engages hub member 1. Disk 6 includes a plurality of holes 6a for frame counting, a diametric slot 6b and a tongue-shaped elastically cantilevered locking bar 6c which is positioned in slot 6b.

Figure 2A:
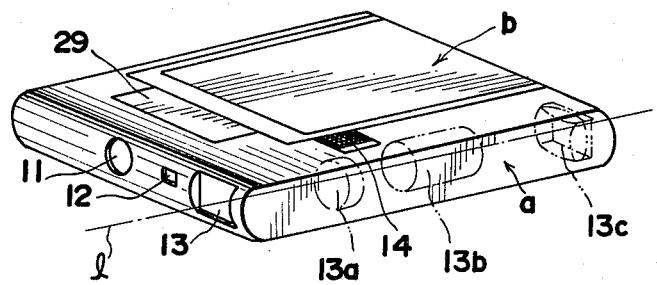
FIG. 2 (A) is a front perspective view of a first embodiment of the present invention, illustrating the improved camera in a contracted inoperative condition.
Figure 2B:
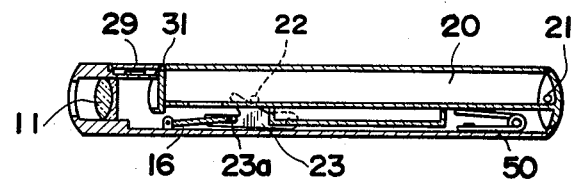
Figure 3A:
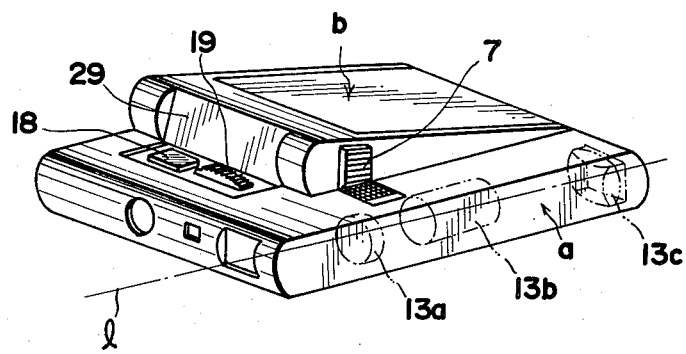
FIG. 3 (A) is a view similar to FIG. 2 (A) but showing the camera in an expanded condition ready for photography.
Figure 3B:
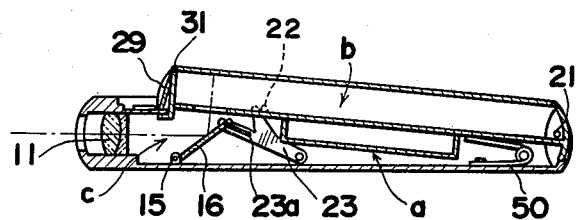
Figure 4:
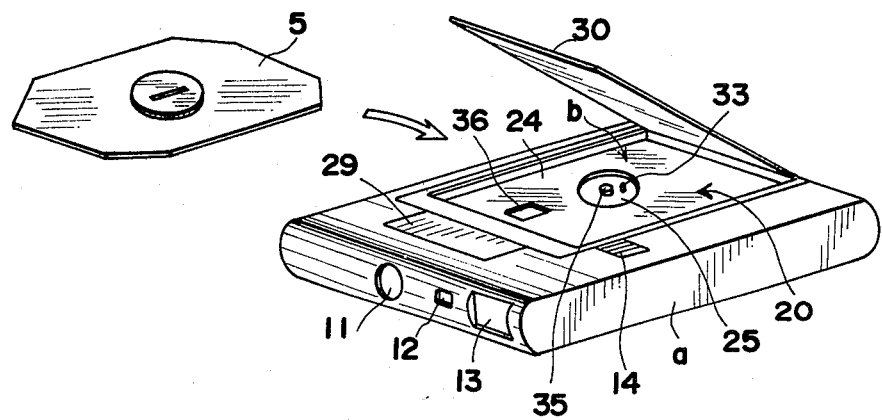
FIG. 4 is a front perspective view of the camera in the process of being loaded with a film cartridge assembly.

FIG. 2 (A) is a perspective view showing the entire appearance of a camera when not in use for photography, and FIG. 2 (B) is a cross-sectional view thereof. FIG. 3 (A) is a perspective view showing the entire appearance of a camera ready for photography, and FIG. 3 (B) is a cross-sectional view of a camera being loaded with a disk type film cartridge assembly.

As best seen in FIGS. 2 (A) to 3 (B) the camera is set to a photographic mode from its inoperative condition where photography is impossible when a sliding lock button 14 is operated by a photographer, so that a film cartridge assembly housing section b is unlocked. Film cartridge assembly housing section b is then swung clockwise around pivot pin 21 by a hairpin spring 50 provided inside camera body a, thereby projecting from the camera body (FIG. 3).

An objective lens 11, a light entry window 12 for a light receiving element and a viewfinder window 13 are laterally spaced and located in the front wall of camera body a. A shutter release button 18 and a focus knob 19 are disposed at the top forward surface of camera body a, (as shown in FIG. 3 (A)) the surface being covered with a shield plate 29. Lock button 14 is also provided on the top surface of camera body a, and pivot or rotational pin 21 is located at the rear of the camera body a. Elements 13a, 13b and 13c constituting a viewfinder optical system are all provided inside camera body a (as illustrated in FIGS. 2 and 3). Thus, the viewfinder optical axis l is fixed in relation to camera body a. Also provided inside camera body a is a swingable lever 23 having two arms, one arm end of which abuts on follower or shaft 22 secured to the side wall of film chamber 20 of film cartridge assembly housing section b, and the other arm end thereof is connected by way of a slot 23a in the latter arm to a pullover pin carried by the side of reflecting mirror 16 which is pivotally supported by shaft 15 on the floor of camera body a and is biased in a clockwise direction by a spring, as shown in FIG. 3.

As described earlier, film cartridge assembly housing section b is supported by pin 21 and is swingable between the advanced or projecting position shown in FIG. 3 (A) and 3 (B) and the retracted or housing position shown in FIG. 2 (A) and 2 (B). Cover plate 29 is pivotally supported by shaft 31 at the front end on the top surface thereof and is biased counter-clockwise by a spring (not shown). Provided on the side of the housing section b is protusion 7 which engages lock button 14. Protusion 7 maintains film cartridge assembly housing section b in its projected state shown in FIG. 3 (A) so that the housing section b is not moved inadvertently to its housed state shown in FIG. 2 (A).

Figure 5:
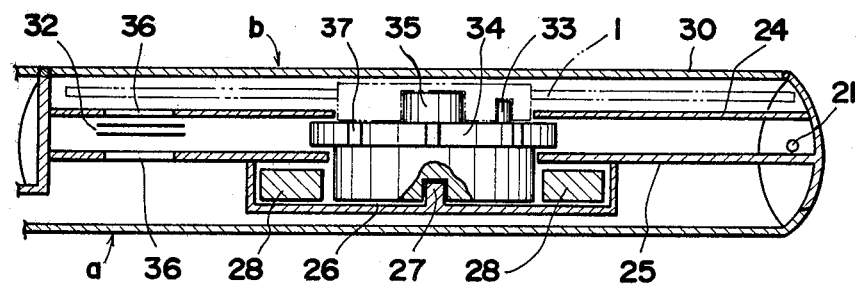
FIG. 5 is a vertical longitudinal cross-sectional view of the camera showing the film advance drive mechanism.
Figure 6:
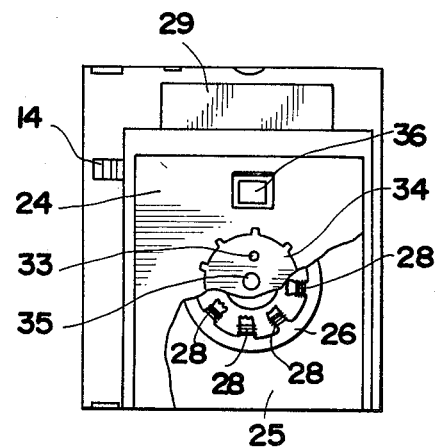
FIG. 6 is a partially fragmented top plan view of the camera with the film cartridge chamber cover removed.

Furthermore, a cover 30 is pivotally supported by the rear edge of the top surface of film cartridge assembly housing section b and provides access therein. As shown in FIG. 5, the inside of film cartridge assembly housing section b is divided into two vertically spaced compartments by horizontal partition plates 24 and 25, cover 30 and partition plate 24 constituting a cartridge chamber 20 for housing therein a film cartridge 5. A shutter 32 is disposed between partition plates 24 and 25 and a forshortened compartment 26 depends from the center of and is formed with partition plate 25. A rotor 34 and stators 28 constituting a stepping motor for advancing the disk film are housed therein. A shaft 35 of the stepping motor engages spindle hole 1b of hub member 1 in the disk type film cartridge assembly, and a coupling element 33 engages coupling hole 1c in hub member 1. A projection 27 located at the center of compartment 26 engages a central hole or well in rotor 34. Integrally formed on the bottom of rotor 34 are a plurality of permanent magnets with their respective poles (S and N) circumferentially reversed in successive sequence. Furthermore, a plurality of stators 28 are fixed to the periphery of compartment 26 at equally circumferential spaced angular intervals to face the respective permanent magnets, as shown in FIG. 6, thereby rotating rotor 34 by one step or increment per pulse of electric current. It should be noted that an exposure window 36 is formed on each of partition plates 24 and 25 in registry with shutter 32. Thus, with the camera loaded with a disk type film cartridge assembly, hub member 1 is rotated integrally with disk type film 4 by one frame when rotor 34 is rotated by one step. Specifically, the following equation is possible where the rotational angle of rotor 34 in the stepping motor is $\alpha$ and the number of frames of a disk type film is N:

$$\alpha = 360/(N+1)$$

Therefore, with rotor 34 arranged to rotate by an angle or per step, disk type film 4 is advanced by one frame. Moreover, shutter 32 is provided between partition plates 24 and 25 in film cartridge assembly housing section b, and exposure window 36 is provided in each partition plate 24 and 25. During photography, film cartridge assembly housing section b swings clockwise in relation to camera body a and advances or withdraws from camera forming space c (refer to FIG. 3 (A), thereby causing reflecting mirror 16 to enter camera forming space c. As a result, a photographic light path is provided between objective lens 11 and disk type film 4.

Figure 7:
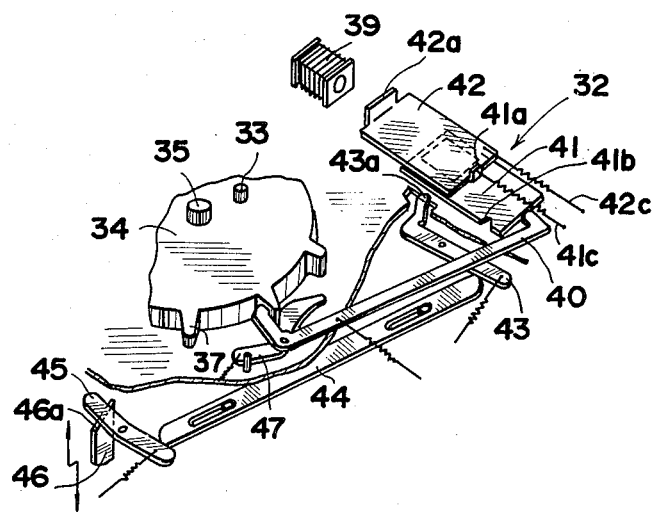
FIG. 7 is a perspective view of the camera shutter charging mechanism.

Referring to FIG. 7 which shows the camera shutter charging mechanism which is actuated in response to the advancing operation of disk type film 4 by one frame through the one step rotation of rotor 34 of the stepping motor, the shutter mechanism is illustrated in the condition of the mechanism prior to shutter charging. When rotor 34 of the stepping motor rotates clockwise by one step or increment as shown in FIG. 7, disk type film 4 is advanced by one frame. Concurrently, however, a charge interconnecting lever 40 is swung counter-clockwise against the force of a biased spring by teeth or projections 37 which are integrally formed with and equally spaced along the periphery of film advancing rotor 34 so as to face the positions of film frames, whereby the leading shutter plate 41 of shutter 32 is pushed leftwards. Projection 41a formed on leading shutter plate 41 pushes trailing shutter plate 42 leftwards at the same time to press a flange portion 42a on plate 42 against the magnetic pole of an electromagnet 39 to cock the shutter. Leading shutter plate 41 is releasably maintained in its cocked position by pawl 43a of stop lever 43 and trailing shutter plate 42 is also maintained in its cocked position by projection 41a against the force of springs 41c and 42c, respectively. Connecting bar 44, whose one end abuts on stop lever 43, is laterally slidable by means of cooperating pins and grooves, and the other end thereof abuts one arm of a release interconnecting lever 45 which is rotatably supported by a shaft and biased in the clockwise rotation. The cam or oblique surface 46a of a release coupling bar 46 abuts the side edge of the other end of release interconnecting lever 45 to impede its clockwise rotation under the influence of a biasing spring.

When shutter release button 18 (FIG. 3 (A)) is operated, release interconnecting bar 46 is shifted upwardly as viewed in FIG. 7 to swing release interconnecting lever 45 counter-clockwise by means of cam surface 46a against the opposing biasing force. The swinging of release interconnecting lever 45 counter-clockwise pushes connecting bar 44 rightwards, which, in turn, swings leading shutter curtain stop lever 43 counter-clockwise and retracts stop pawl 43a thereof from notch 41b in leading shutter plate 41, whereby leading shutter plate 41 begins travelling under the action of spring 41c to start the exposure control.

Figure 8:
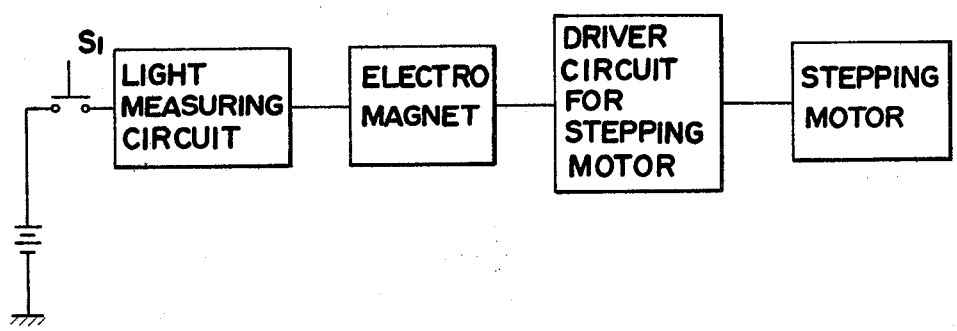
FIG. 8 is a block diagram of an electric circuit incorporated in the camera.

After the lapse of a predetermined time, a light measuring circuit (FIG. 8) supplies an electric current to electromagnet 39. Electromagnet 39 is of a combination type comprising a permanent magnet and an electromagnet, with iron piece 42a, being normally attracted to the permanent magnet at all times. However, the permanent magnetic force is momentarily offset by the electric current fed to the electromagnet. As a result, trailing shutter plate 42 starts travelling under the action of spring 42c thereby completing the exposure sequence, and closing the shutter. Stators 28 of the stepping motor are actuated by a pulse current generated by the shutter closing operation to thereby rotate rotor 34 by one step, whereby film advancing by one frame is done, as described above. The rotation of rotor 34 causes succeeding projections 37 to engage shutter charge interconnecting bar 40 which is, in turn, rotated counter-clockwise, whereby the shutter is charged, as described above. An auxiliary lever 47 is coaxially pivoted with shutter charge interconnecting bar 40 and is biased to abut against the periphery of rotor 34, thereby allowing projections 37 to resiliently engage the end of shutter charge interconnecting bar 40, whereby rotor 34 is held at predetermined angular position so as not to be undesirably moved in its rotating direction.

Figure 9:
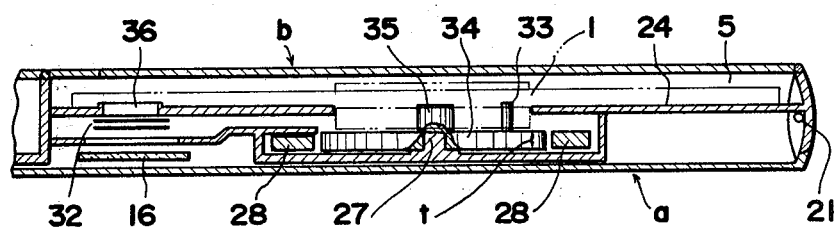
FIG. 9 is a view similar to FIG. 5 of another embodiment of the present invention.

Shown in FIG. 9 is another embodiment of the present invention, wherein radial index ears 1a, which are formed on hub member 1 provided in the disk type film cartridge assembly, are arranged to act as projections 37 in the preceding embodiment, thereby further reducing the thickness of the camera body. Specifically, shutter charge interconnecting bar 40 and auxiliary lever 47 shown in FIG. 7 employed in the shutter charging operation are positioned to be engageable with radial index ears 1a of a film cartridge assembly loaded in film cartridge assembly housing section b, and are arranged so that shutter charge interconnecting bar 40 is actuated by radial index ears 1a when hub member 1 is rotated by the film advancing operation to charge or cock the shutter in the manner described above. Consequently, with the embodiment of FIG. 9, rotor 34 requires no projections 37 and therefore, only the portion thereof facing stators 28 is formed on rotor 34. As a result, it is possible to make the thickness t of rotor 34 extremely thin, thereby allowing the flatness of the camera body to be further enhanced.

According to the present invention, film cartridge assembly housing section b is formed such that it can be housed in camera body a, as described above, facilitating a flat camera construction, particularly when carried in a dormant or inoperative condition, by placing film cartridge assembly housing section b in camera body a.

While there have been described and illustrated preferred embodiments of the present invention, it is apparent that numerous alterations, additions and omissions may be made without departing from the spirit thereof.

What is claimed is:

1. A camera for use with a disk type film cartridge incorporating a disk type film and a hub member rotatably supported by said cartridge and fixed to the film to rotate therewith, comprising:
   a cartridge chamber section having a chamber for replaceably receiving said disk type film cartridge;
   a stepping motor including a stator stationary relative to said cartridge chamber section and a rotor rotatable relative to the stator, said rotor including a coupling portion directly engagable with said hub member so as to directly rotate the hub member; and
   a driving circuit for rotating said rotor a predetermined angle of rotation such that said film is advanced by one frame.

2. A camera as set forth in claim 1, wherein said rotor is coaxial with the hub member of said cartridge housed in said chamber.

3. A camera as set forth in claim 1, further comprising:
   a shutter mechanism provided on said cartridge chamber section; and
   a shutter driving mechanism provided on said cartridge chamber section for driving said shutter mechanism, said shutter driving mechanism being coupled to said rotor of said stepping motor whereby to cock said shutter driving mechanism in response to the rotation of said rotor.

4. A camera as set forth in claim 1, further comprising:
   a shutter mechanism provided on said cartridge chamber section; and
   a shutter driving mechanism provided on said cartridge chamber section for driving said shutter mechanism, said shutter driving mechanism being drive coupled to the hub member of said cartridge received in said chamber whereby to cock said shutter driving mechanism with the rotation of said hub member.

5. A camera as set forth in claim 1, wherein said rotor is mounted to said cartridge chamber section.

6. A camera as set forth in claim 5, further comprising:
   a camera body section for housing said cartridge chamber section;
   a hinge member movably supporting said cartridge chamber on said camera body section so that said chamber section is movable between a retracted position within said camera body section and an extended position where it projects from said camera body section; and
   an objective lens provided on said camera body section, said objective lens being stationary during the movement of said cartridge chamber section between said retracted position and extended positions.

7. A camera as set forth in claim 6, further comprising a viewfinder optical system fixed to said camera body section.

8. A camera as set forth in claim 6, wherein said camera body section is of a flat rectangular form having a narrow side wall provided with light entry window for said objective lens and wherein said camera further comprises a mirror provided in said camera body section, said mirror being movable between an operative position wherein said mirror is located in the photographic optical path of said objective lens and a rest position wherein said mirror is out of said photographic optical path.

9. A camera as set forth in claim 6, further comprising means for moving said mirror from its rest to its operative position in response to the movement of said cartridge chamber section from its retracted to its extended position.

10. A camera as set forth in claim 9, further comprising means urging said cartridge chamber section toward its extended position.

* * * * *